(12) United States Patent
Kudla et al.

(10) Patent No.: US 11,693,102 B2
(45) Date of Patent: Jul. 4, 2023

(54) TRANSMITTER AND RECEIVER CALIBRATION IN 1D SCANNING LIDAR

(71) Applicant: Infineon Technologies AG, Neubiberg (DE)

(72) Inventors: Wojciech Kudla, Wageningen (NL); Boris Kirillov, Graz (AT); Vladimir Petrovic, Eindhoven (NL); Hendrikus Van Lierop, Bj Weert (NL)

(73) Assignee: Infineon Technologies AG, Neubiberg (DE)

( * ) Notice: Subject to any disclaimer, the term of this patent is extended or adjusted under 35 U.S.C. 154(b) by 1047 days.

(21) Appl. No.: 16/434,499

(22) Filed: Jun. 7, 2019

(65) Prior Publication Data

US 2020/0386876 A1 Dec. 10, 2020

(51) Int. Cl.
| | |
|---|---|
| *G01S 7/497* | (2006.01) |
| *G01S 17/42* | (2006.01) |
| *G01S 17/10* | (2020.01) |
| *G01S 7/484* | (2006.01) |
| *G01S 7/4865* | (2020.01) |
| *G01S 7/481* | (2006.01) |

(52) U.S. Cl.
CPC ............ *G01S 7/4972* (2013.01); *G01S 7/484* (2013.01); *G01S 7/4816* (2013.01); *G01S 7/4817* (2013.01); *G01S 7/4865* (2013.01); *G01S 7/497* (2013.01); *G01S 17/10* (2013.01); *G01S 17/42* (2013.01)

(58) Field of Classification Search
CPC .... G01S 7/4972; G01S 7/4816; G01S 7/4817; G01S 17/42; G01S 17/10; G01S 7/484; G01S 7/4865; G01S 7/497; G01S 17/86; G01S 7/4863; G01S 7/4814; G01S 7/4808
See application file for complete search history.

(56) References Cited

U.S. PATENT DOCUMENTS

| | | | | |
|---|---|---|---|---|
| 2018/0284280 | A1* | 10/2018 | Eichenholz | ............ G01S 7/4816 |
| 2019/0011556 | A1* | 1/2019 | Pacala | ...................... G01S 7/497 |
| 2019/0145891 | A1* | 5/2019 | Waxman | .................. G01M 3/38 356/409 |
| 2020/0341116 | A1* | 10/2020 | Smith | ...................... G01S 17/89 |

* cited by examiner

*Primary Examiner* — Georgia Y Epps
*Assistant Examiner* — Erin R Garber
(74) *Attorney, Agent, or Firm* — Harrity & Harrity, LLP

(57) ABSTRACT

A Light Detection and Ranging (LIDAR) system is provided. The LIDAR system includes a LIDAR transmitter configured with a first field of view and configured to transmit laser beams into the first field of view at a plurality of discrete transmission angles in order to scan the first field of view with the laser beams; a LIDAR receiver configured with a second field of view and configured to receive reflected laser beams from the second field of view and generate electrical signals based on the received reflected laser beams; and a controller configured to shift at least one of the first field of view or the second field of view based on a misalignment in order to optimize an overlap of the first field of view and the second field of view.

21 Claims, 11 Drawing Sheets

Before Auto-calibration, Front View:

After Auto-calibration, Front View:

Before Auto-calibration with Distortion Front View:

After Auto-calibration with Distortion Front View:

TRANSMITTER AND RECEIVER CALIBRATION IN 1D SCANNING LIDAR

FIELD

The present disclosure relates generally to devices and methods for Light Detection and Ranging (LIDAR) systems.

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

LIDAR transmitters may fire light as a narrow laser beam at different horizontal or vertical positions in a field of view. However, if the receiver field of view is not aligned with the transmitter field of view, errors in detecting backscattered light may occur. For example, this may result in undetected areas or gaps in the field of view that are not readable to the LIDAR system. This may in turn result in dark spots in images. Therefore, an improved device that performs transmitter and/or receiver calibration in order to reduce or prevent such misalignments may be desirable.

SUMMARY

Embodiments provide object scanning systems and methods for operating the same, and, more particularly, to aligning a transmitter field of view and a receiver field of view.

According to one or more embodiments, a Light Detection and Ranging (LIDAR) system includes a LIDAR transmitter configured with a first field of view and configured to transmit laser beams into the first field of view at a plurality of discrete transmission angles in order to scan the first field of view with the laser beams; a LIDAR receiver configured with a second field of view and configured to receive reflected laser beams from the second field of view and generate electrical signals based on the received reflected laser beams; and a controller configured to shift at least one of the first field of view or the second field of view based on a misalignment in order to optimize an overlap of the first field of view and the second field of view.

One or more embodiments provide a method of calibrating a Light Detection and Ranging (LIDAR) system. The method includes configuring a LIDAR transmitter with a first field of view; configuring a LIDAR receiver with a second field of view; transmitting laser beams into the first field of view at a plurality of discrete transmission angles in order to scan the first field of view with the laser beams; receiving reflected laser beams from the second field of view; generating electrical signals based on the received reflected laser beams; and shifting at least one of the first field of view or the second field of view based on a misalignment in order to optimize an overlap of the first field of view and the second field of view.

BRIEF DESCRIPTION OF THE DRAWINGS

Embodiments are described herein making reference to the appended drawings.

DETAILED DESCRIPTION

Figure 1A:
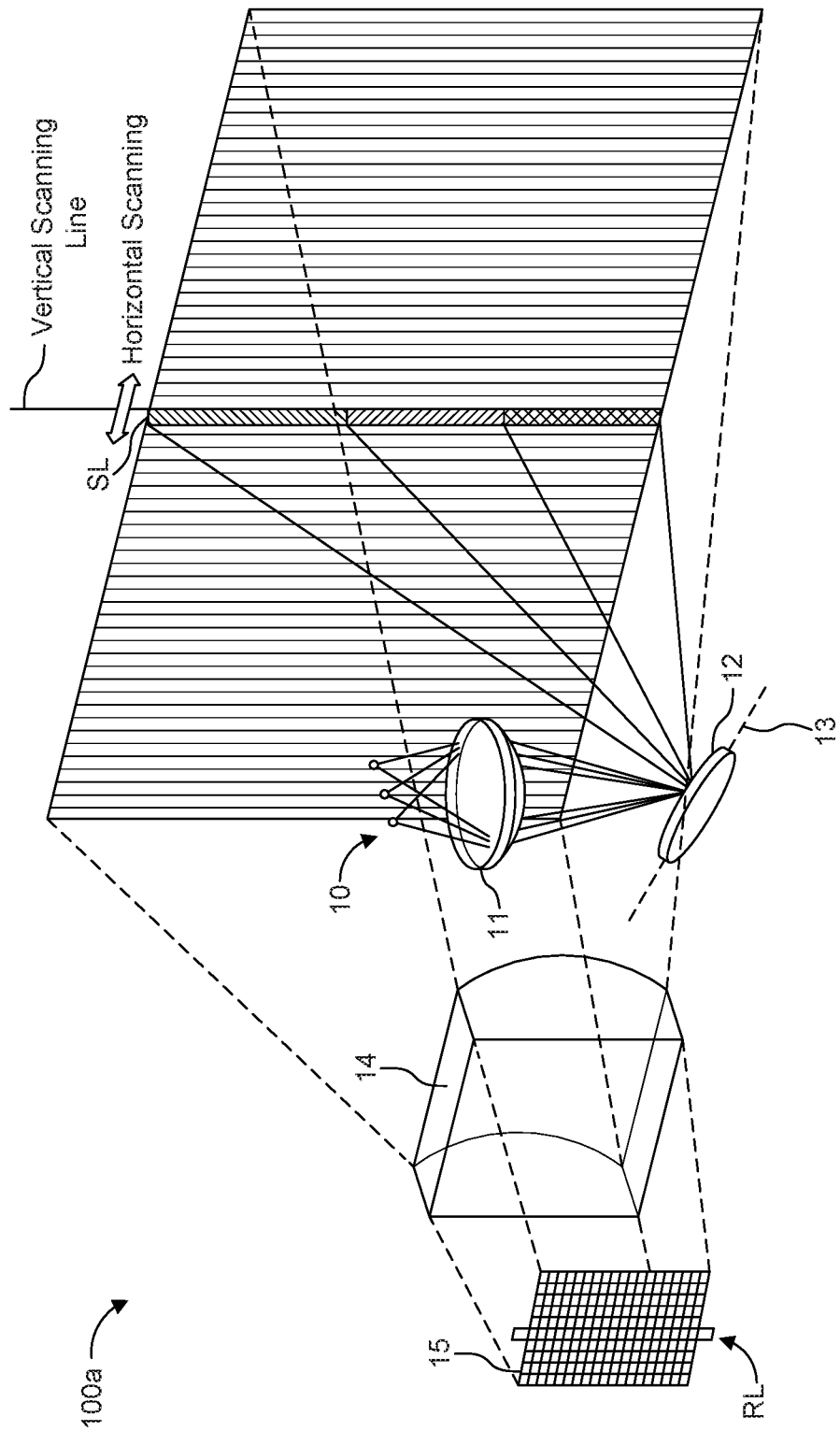
FIG. 1A is a schematic diagram of a horizontal LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electrical signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view (FOV) and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Currently, a photodetector array may be used to measure the reflected light. The photodetector array may be a two-dimensional (2D) array that consists of multiple rows and multiple columns of photodetectors (pixels) arranged in a grid-like arrangement. Each pixel row or group of adjacent pixel rows may be readout as a measurement signal in the form of raw analog data. Each measurement signal may include data from a single pixel column or from two or more pixel column corresponding to the selected pixel row or rows.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance. In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1A is a schematic diagram of a LIDAR scanning system 100a in accordance with one or more embodiments. The LIDAR scanning system 100a is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15. The receiver may further include receiver circuitry, such as data acquisition/readout circuitry and data processing circuitry, as will be further described according to FIG. 2. The LIDAR scanning system 100a uses pulsed modulation, similar to the LIDAR technique described above, to measure a distance to a 3D object by measuring the absolute time a light pulse takes to travel from a source into the 3D scene and back, after reflection.

Turning back to FIG. 1A, the photodetector array 15 is arranged in such a manner that an intended field of view is mapped vertically on the vertical extension of the photodetector array 15. A received light beam will hit only a specific row or group or rows of the detector array depending on the vertical angle of the received light beam. The intended field of view is also mapped horizontally on the horizontal extension of a 2D photodetector array.

In particular, a transmitter field of view may comprise of a plurality of discrete transmission angle regions that originate from the transmitter (e.g., from the MEMS mirror 12). The center of each discrete angle region represents a transmission angle/direction of the fired laser beam. The MEMS mirror 12 may have a discrete number of transmission positions (i.e., rotation angles), each corresponding to one or more of the discrete transmission angle regions at which light is transmitted. A firing of a light source may be timed to coincide with a specific transmission position of the MEMS mirror 12 or a particular transmission angle region. Thus, each transmission position represents a transmission direction of the fired laser beam and a transmission direction may be adjusted by adjusting a timing of firing a light source to coincide with a transmission position of the MEMS mirror 12.

In the case of horizontal scanning, each discrete transmission angle may be mapped to both a transmission position of the MEMS mirror 12 and one or more pixel columns of the photodetector array 15. Thus, light transmitted at a particular transmission angle region should be incident on the corresponding mapped pixel column or columns of the photodetector array 15. Consequently, each light source (i.e., each laser channel) has a transmission timing that is mapped to a particular transmission angle region or transmission position and that is further mapped to a pixel column or columns of the photodetector array 15.

Each light source is also mapped to pixel row or a group of pixel rows of the photodetector array 15. Thus, individual pixels may be activated based on a light source and a firing thereof, which coincides with a particular transmission angle region. As a result, each pixel of the photodetector array 15 is mapped to a light source and to a particular transmission angle region, where the particular transmission angle region is mapped to specific transmission position of the MEMS mirror 12.

Mappings may exist for each light source and for each pixel. Each mapping may be stored in memory of the system controller 23 (see FIG. 2), for example, in the form of a look-up table. Calibrating the transmitter and/or the receiver may include updating mapping information stored in one or more look-up tables.

In this example, the illumination unit 10 includes three light sources (e.g., laser diodes or light emitting diodes) that are linearly aligned in single bar formation and are configured to transmit light used for scanning the field of view for objects. The light sources may be fired as a single unit (i.e., simultaneously as a single laser diode) or at different timings as separate laser diodes.

The light emitted by the light sources is typically infrared light although light with another wavelength might also be used. As can be seen in the embodiment of FIG. 1A, the shape of the light emitted by the light sources is spread in a direction perpendicular to the transmission direction to form a light beam with an oblong shape perpendicular to a transmission direction. The illumination light transmitted from the light sources are directed towards the transmitter optics 11 configured to focus each laser onto a MEMS mirror 12 that scans in one dimension. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source. However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

It is also noted that a horizontal width of each laser beam corresponds to a discrete angle region at which the laser beam is projected into the field of view in the horizontal direction. The width of each beam may correspond to the width of one pixel column of the photodetector array 15. However, it is more preferable that the width of each beam, and thus the discrete angle region at which the laser beam is projected, be smaller than the width of one pixel column.

Accordingly, the transmitter of the system 100 is an optical arrangement configured to generate laser beams based on the laser pulses, the laser beams having an oblong shape extending in a direction perpendicular to a transmission direction of the laser beams. As can be seen from FIG. 1A, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example, the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two consecutive scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans.

Each laser beam has a divergence in the horizontal direction. Specifically, the width of each laser beam may have a Gaussian shape, where a laser beam has a peak intensity at its center and the intensity drops down on the sides. Thus, while each laser beam extends lengthwise in the vertical direction, its width also may cover a discrete range of angles (i.e., an angle region) in the horizontal direction. Therefore, an angle region, as used herein, refers to a region that includes a plurality of discrete angles. As the transmitter fires laser beams into the field of view at different positions (i.e., based on the position of the MEMS mirror 12), different angle regions in the horizontal direction of the field of view are sampled.

When it is said that two angle regions overlap, the overlapping angle regions may correspond to beams fired by a same laser diode at different times. "A same laser diode" may refer to multiple light sources that are configured to fire light simultaneously to generate a laser beam (i.e., a full or partial scanning line) having a width that fully occupies the angle region throughout the lengthwise extension of the beam produced by all light sources. Alternatively, "a same laser diode" may refer to a single light source that is configured to generate a laser beam (i.e., a partial scanning line) having a width that fully occupies the angle region throughout the lengthwise extension of the beam produced by only that light source. Thus, a plurality of beams are those generated by a same laser diode and the beam width of each laser beam fully occupies the angle region of the field of view throughout a lengthwise extension of the laser beam.

While the transmission mirror is described in the context of a MEMS mirror, it will be appreciated that other 1D mirrors or even 2D mirrors having two orthogonal rotation axes can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100a as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line RL is shown as a vertical column of light that extends along one of the pixel columns in a lengthwise direction of the pixel column. The receiving line has three vertical regions that correspond to the vertical regions of the vertical scanning line SL shown in FIG. 1A. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL. Thus, LIDAR transmitters may fire light as a narrow laser pulse at different positions in a field of view, where each firing position corresponds to a pixel column of the photodetector array 15.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. The activation of the photodiodes may be synchronized with light pulses emitted by the illumination unit 10.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance measurement, processing circuitry, such as a microcontroller, a field programmable logic arrays (FPGA), or a processor, triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by one or more receiving photodiodes of the photodetector array 15. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to stop the timer. The TDC uses a clock frequency to calibrate each measurement. The TDC sends the serial data of the differential time between the start and stop digital signals to the processing circuitry, which filters out any error reads, averages multiple time measurements, and calculates the distance to the target at that particular field position. By emitting successive light pulses in different directions established by the MEMS mirror 12, an area (i.e., a field of view) can be scanned, a three-dimensional image can be generated, and objects within the area can be detected.

The signal processing chain of the receiver may also include an ADC for each photodiode or for a group of photodiodes. The ADC is configured to convert the analog electrical signals from the photodiodes or group of photodiodes into a digital signal that is used for further data processing.

In addition, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a vertical column of light that may, for example, have the width of one photodetector pixel and a length that spans vertically at least partially along a pixel column of the photodetector array 15 in a lengthwise direction. That is, all photodetector pixels in a pixel column or a portion of the photodetector pixels of the pixel column may receive the bar of light. For example, in one instance, all light sources of the illumination unit 10 may be used to generate the scanning line SL/receiving line RL. In this case, the receiving line RL may extend along a full pixel column in the lengthwise direction. In another instance, only a subset of the light sources may be used to generate the scanning line SL/receiving line RL. In this case, the receiving line may extend along only a portion of the pixel column in the lengthwise direction.

In some instances, two or more pixel columns may receive light from a same bar of light. For example, two pixel columns may receive light when a portion of the received bar of light impinges on an area between two photodetector pixels. In this case, two pixel columns may be partially illuminated by a single bar of light in the width direction.

On the other hand, if a partial vertical scanning line SL is generated by the illumination unit 10, as described above, then only a partial pixel column of the photodetector array 15 may be illuminated in a lengthwise direction.

The photodetector array 15 is configured to generate measurement signals (electrical signals) used for generating a 3D map of the environment based on the reflected light (e.g., via TOF calculations and processing). For example, as noted above, the photodetector array 15 may be a 2D array of photodiodes or other light detection component capable of detecting and measuring light, and generating electrical signals therefrom.

While not shown, the LIDAR scanning system 100a may also include a digital micromirror device (DMD) and a secondary optics (e.g., a lens, a total internal reflection (TIR) prism, or a beam splitter) that are configured to initially receive the reflected light through the primary optics 14, and redirect the received reflected light towards the photodetector array 15. For example, the DMD would first receive the reflected light pulse from the primary optics, and deflect the received reflected light through the secondary optics (e.g., a lens, a total internal reflection (TIR) prism, or a beam splitter) onto the photodetector array 15. In this case, the photodetector array 15 would still receive a vertical column of light, as described above.

Figure 1B:
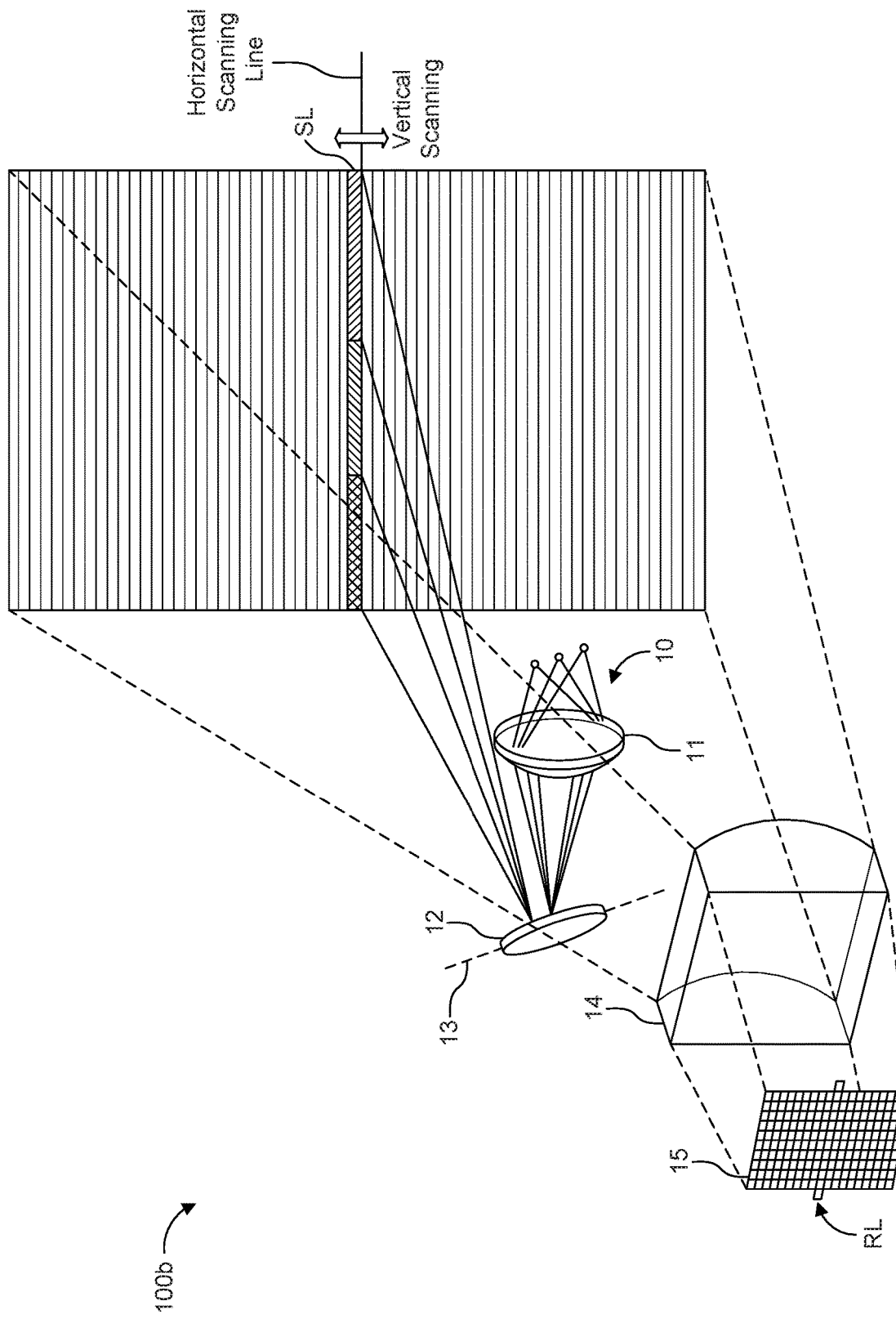
FIG. 1B is a schematic diagram of a vertical LIDAR scanning system in accordance with one or more embodiments.

FIG. 1B is a schematic diagram of a vertical LIDAR scanning system 100b in accordance with one or more embodiments. In particular, the LIDAR scanning system 100b is similar to the LIDAR scanning system 100a, with the exception that the scanning direction is rotated 90° such that the scanning line SL and the receiving line RL move in the vertical direction (i.e., from top to bottom or from bottom to top). As such, the scanning line is a horizontal scanning line SL that is projected into the field of view that moves vertically across the field of view as the transmission mirror oscillates about the single scanning axis. Furthermore, as the horizontal scanning line SL moves vertically across the field of view, the horizontal column of light RL incident on the 2D photodetector array 15 also moves vertically across the 2D photodetector array 15.

Furthermore, each transmission position of the transmitter may correspond to a pixel row of the photodetector array 15. For example, in this setup, reflective pulses arrive at the photodetector array 15 as a horizontal row of light that may, for example, have the width of one photodetector pixel and a length that spans horizontally at least partially along a pixel row of the photodetector array 15 in a lengthwise direction. That is, all photodetector pixels in a pixel row or a portion of the photodetector pixels of the pixel row may receive the bar of light. For example, in one instance, all light sources of the illumination unit 10 may be used to generate the scanning line SL/receiving line RL. In this case, the receiving line RL may extend along a full pixel row in the lengthwise direction. In another instance, only a subset of the light sources may be used to generate the scanning line SL/receiving line RL. In this case, the receiving line may extend along only a portion of the pixel row in the lengthwise direction.

In some instances, two or more pixel rows may receive light from a same bar of light. For example, two pixel rows may receive light when a portion of the received bar of light impinges on an area between two photodetector pixels. In this case, two pixel rows may be partially illuminated by a single bar of light in the width direction.

On the other hand, if a partial horizontal scanning line SL is generated by the illumination unit 10, as described above, then only a partial pixel row of the photodetector array 15 may be illuminated in a lengthwise direction.

Each laser beam has a divergence in the vertical direction. Specifically, the width of each laser beam may have a Gaussian shape, where a laser beam has a peak intensity at its center and the intensity drops down on the sides. Thus, while each laser beam extends lengthwise in the horizontal direction, its width may also cover a discrete range of angles (i.e., an angle region) in the vertical direction. Therefore, an angle region, as used herein, refers to a region that includes a plurality of discrete angles. As the transmitter fires laser beams into the field of view at different positions (i.e., based on the position of the MEMS mirror 12), different angle regions in the vertical direction of the field of view are sampled.

It will be appreciated that, while some embodiments are described with reference to the horizontal LIDAR scanning system 100a, any embodiment can be similarly applied to both the horizontal LIDAR scanning system 100a and to the vertical LIDAR scanning system 100b. In this sense, the concept of transmitter and/or receiver calibration in the horizontal direction in reference to scanning system 100a is interchangeable with the concept of transmitter and/or receiver calibration in the vertical direction in reference to scanning system 100b, and vice versa.

Figure 2:
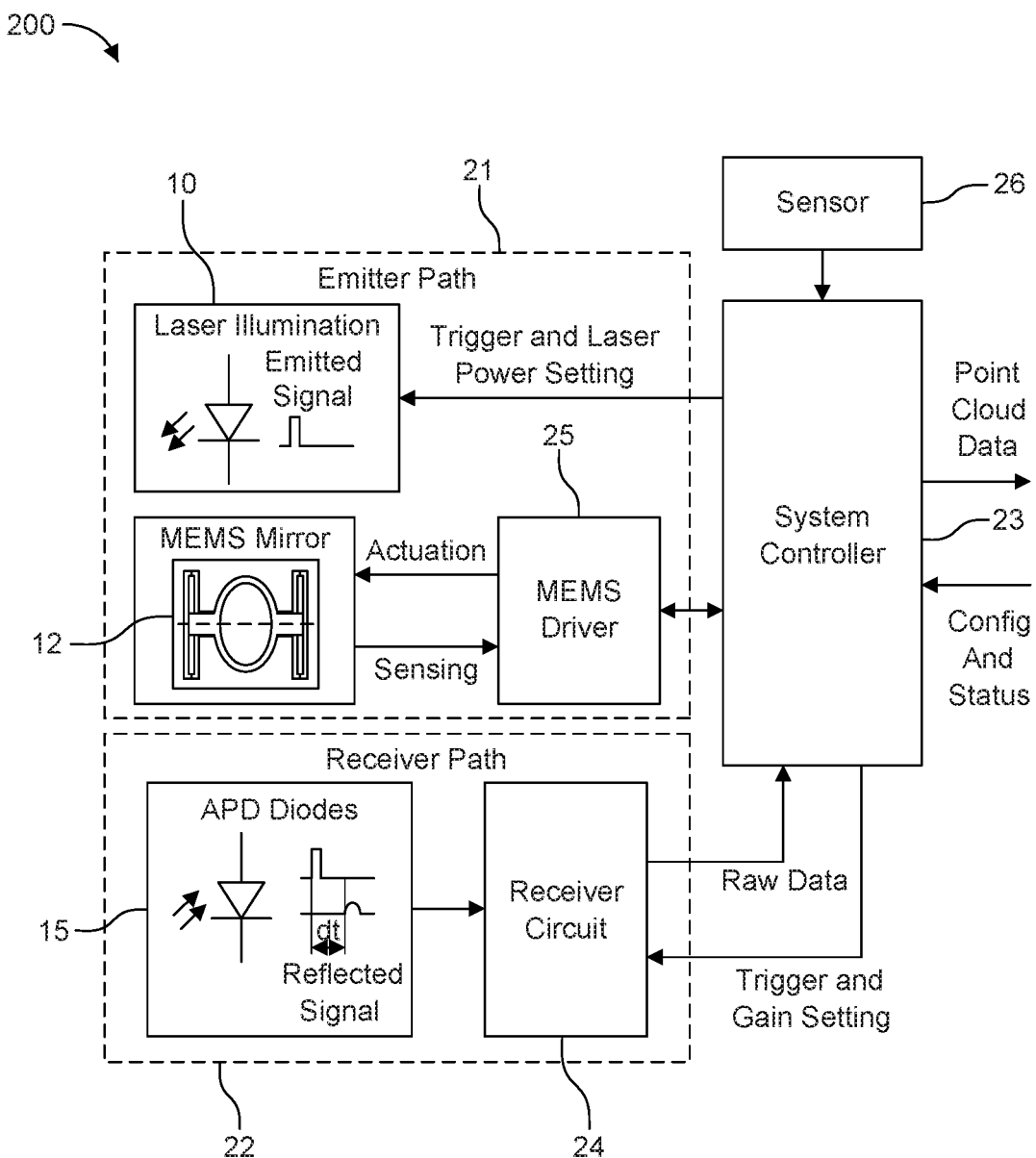
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processing circuitry (e.g., comparators, TDCs, ADCs, FPGAs, and digital signal processors (DSPs)) of a signal processing chain for processing data, as well as control circuitry, such as a microcontroller or a FPGA, that is configured to generate control signals. The control circuitry may also be incorporated as part of the processing circuitry. The LIDAR scanning system 200 may also include a sensor 26, such as a temperature sensor, that provides sensor information to the system controller 23.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photocliodes are activated to sense, and thus measure, a reflected light signal. The controller 23 may refer to the relevant mapping information stored in look-up tables for determining a timing to fire a particular light source and a timing to activate a particular photodiode, and transmit control signals to the illumination unit 10 and to the photodetector array 15 accordingly. Thus, a higher accuracy in position sensing of the MEMS mirror results in a more accurate and precise control of other components of the LIDAR system.

Specifically, the system controller 23 is configured to control the illumination unit 10 and the MEMS mirror 12 to implement a calibrated scanning technique. The firing of laser beams from the illumination unit 10 is coordinated with a rotational (angular) position of the MEMS mirror 12 to transmit laser beams into the field of view based on, for example, a desired timing interval and/or a desired transmission direction.

As noted above, each laser beam covers a discrete angle region of the field of view. The system controller 23 determines a discrete mirror position for each laser beam transmission and synchronizes the laser beam transmission with that discrete mirror position. Thus, each discrete mirror position corresponds to a discrete transmission direction and, consequently, an angle region that is covered by the width of the transmitted laser beam. Furthermore, each transmission position of the transmitter may correspond to a pixel column of the photodetector array 15. Thus, the system controller 23 also determines which photodiodes to activate and which to deactivate based on corresponding light sources and discrete angle regions being sampled by the corresponding light sources.

The receiver unit 22 includes the photodetector array 15 as well as a receiver circuit 24 that includes an analog readout circuit. As will be described in more detail below, each row of the photodetector array 15 may be selectively coupled and decoupled by an analog multiplexer to the receiver circuit 24. A pixel, a row, or a column that is coupled to the receiver circuit 24 may be referred to as active (enabled), while a pixel, a row, or a column that is not coupled to the receiver circuit 24 may be referred to as inactive (disabled).

The analog readout circuit includes N analog output channels (e.g., 32 channels) configured to read out measurement signals received from a selected pixel of a coupled row of the photodetector array 15. Furthermore, more than one pixel from a coupled row may be selected, multiple rows may simultaneously be coupled to an output channel, and one or more pixels may be selected from each coupled row.

The analog readout circuit may include a multiplexer configured to selectively couple receiving pixels to the plurality of analog output channels, thereby activating the coupled pixels, while decoupling non-receiving pixels from the plurality of analog output channels, thereby deactivating the decoupled pixels. A receiving pixel is one that is expected to receive a reflected laser beam based on a discrete transmission direction of a corresponding transmitted laser beam. In contrast, a non-receiving pixel is one that is not expected to receive a reflected laser beam based on a discrete transmission direction of a corresponding transmitted laser beam.

Thus, the receiver circuit 24 may receive the analog electrical signals from the photodetectors of the photodetector array 15 and transmit the electrical signals as raw analog data to an analog-to-digital converter (ADC). Prior to the ADC receiving the electrical signals, the electrical signals may pass through an amplifier (e.g., a transimpedance amplifier (TIA)) that converts the electrical signals from, for example, current into voltage. The ADC is configured to convert the raw analog data into raw digital data for further processing. The amplifier and/or the ADC may be incorporated in the system controller 23 or the receiver circuit 24, or may be interposed between the receiver circuit 24 and the system controller 23 as separate circuits.

The receiver circuit 24 may also receive trigger control signals from the system controller 23 that triggers an activation of one or more photodetectors. The receiver circuit 24 may also receive gain setting control signals for controlling the gain of one or more photodetectors.

The system controller 23 includes signal processing circuitry that receives the raw digital data as well as serial data of a differential time between start and stop digital signals generated by an ADC, and uses the received data to calculate time-of-flight information for each field position within the field of view, to generate object data (e.g., point cloud data), and to generate a 3D point cloud.

Specifically, the signal processing circuitry of the system controller 23 may be configured to detect an object based on the electrical signals generated by the photodetectors of the photodetector array 15. Based on the detection, the signal processing circuitry may determine an estimated position of the object in the field of view, a direction to the object, and/or an angular position of the mirror 12 that correspond to the position of or direction to the object. The system controller 23 may control a transmission of one or more laser beams based on the estimated position of the object while implementing the calibrated scanning technique described herein.

As noted above, the MEMS mirror 12 is configured to oscillate between two extrema positions (e.g., +/−15 degrees) in a horizontal or vertical scanning direction to steer the light over +/−30 degrees (i.e., 60 degrees) making up the full scanning range of the field of view. The receiver, specifically, the photodetector array 15, also has a field of view from which it is capable of receiving and detecting light and more specifically backscattered light. Thus, the transmitter (TX) 21 and the receiver (RX) 22 each have their own field of view (i.e., a TX FOV and an RX FOV, respectively) where only the overlapped portion of the field of views is useful for detecting information and generating image data. A misalignment in the TX and RX FOVs reduced the overlapped area.

As a result, a transmitter and/or a receiver calibration is used to maximize the overlapped area of the field of views. Based on this calibration, the correct receiver columns/pixels are activated to match the FOVs.

A couple conditions are used for the calibration. First, the transmitter 21 and the receiver 22 are mounted on top of each other in order to maximize the overlapped area of their respective FOVs. Second, the actual working FOV of the transmitter 21 is set to be smaller than the full FOV of the transmitter 21. For example, the maximum FOV for the transmitter 21 may be 60 degrees for a maximum mirror tilt of +/−15 degrees. Accordingly, as one example, the working TX FOV of the transmitter 21 may be set to 40 degrees. Having the actual working TX FOV to be smaller than the full (max) TX FOV allows a certain degree of calibration freedom (e.g., +/−10 degrees) when aligning the working TX FOV and the RX FOV.

Figure 3:
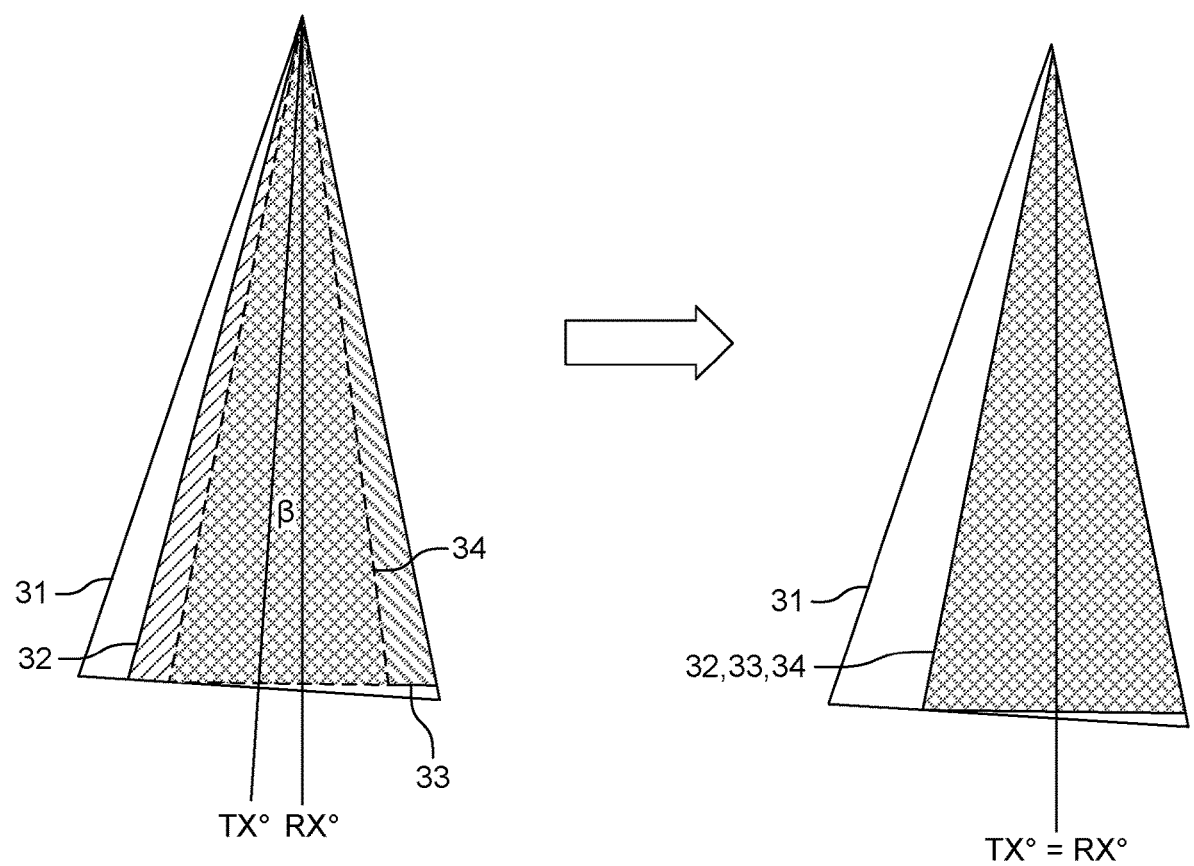
FIG. 3 is a top view of overlapped TX and RX field of views according to one or more embodiments.

FIG. 3 is a top view of overlapped TX and RX field of views according to one or more embodiments. The left diagram shows the field of views prior to calibration and the right diagram shows the field of views after calibration.

The field of views include a full TX FOV 31, a working TX FOV 32, and an RX FOV 33. An overlapped area 34 is an area where the working TX FOV 32 and the RX FOV 33 overlap.

As can be seen in the left diagram, a misalignment angle β between the transmitter 21 and the receiver 22 reduces the overlapped area 34. In particular, the misalignment results in the misalignment angle β between a discrete transmission angle TX0° of the transmitter 21 and a discrete receive angle RX0° of the receiver 22 that corresponds to a pixel column. For example, the discrete transmission angle TX° may be 0° (i.e., the mirror tilt angle is 0°) and the discrete receive angle RX° may also be 0° mapped to a center pixel column of the photodetector array 15. A misalignment exists when the misalignment angle β is greater 0°.

In contrast, as can be seen in the right diagram, the TX FOV 32 has been shifted to be aligned with the RX FOV 33 such that the overlapped area 34 is maximized. In this case, the misalignment angle β is 0°. In the alternative, it will be appreciated that the RX FOV 33 could be shifted to be aligned with the TX FOV 32 to reduce or eliminate the misalignment.

In order to mitigate the misalignment, either the TX FOV 32 or the RX FOV 33 may be configured to be slightly (e.g., up to 10%) larger than the other FOV to compensate for the worst case misalignment. However, from the system performance perspective, the RX FOV 33 should be kept as small as possible in order to limit ambient light and noise. Thus, it may be preferable that the TX FOV 32 is larger than the RX FOV 33. This can be achieved by modifying the tilt range of the MEMS mirror 12. As a result, of the RX FOV 33 being smaller, for example, in one or both of the horizontal and vertical directions, than the TX FOV 32, part or the entire RX FOV 33 may be encompassed by the TX FOV 32. In other words, the RX FOV 33 may be fully overlapped by the TX FOV 32 in the horizontal direction, the vertical direction, or both.

Figure 4A:
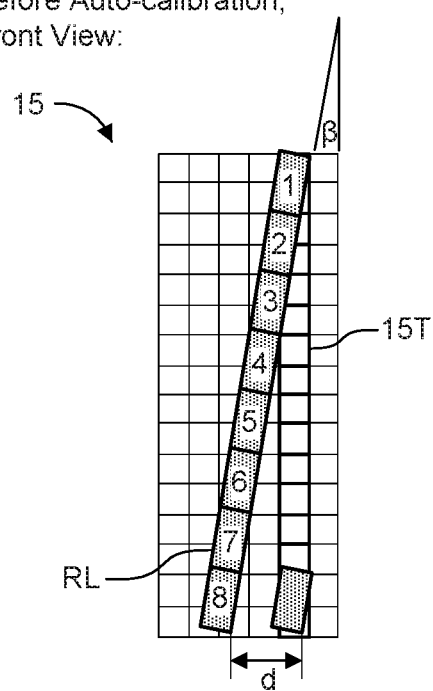
FIGS. 4A and 4B illustrate transmitter side compensation techniques used to align a TX FOV with an RX FOV according to one or more embodiments.
Figure 4A:
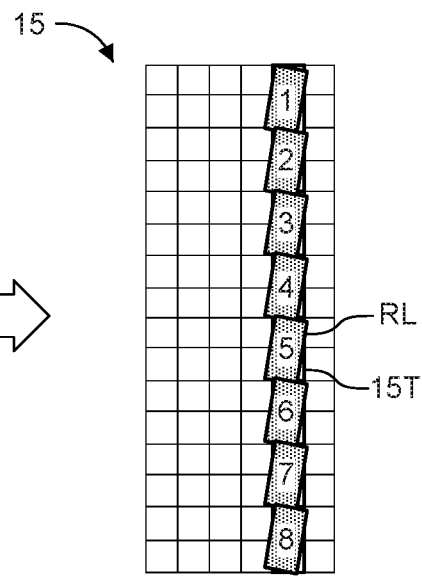
Figure 4B:
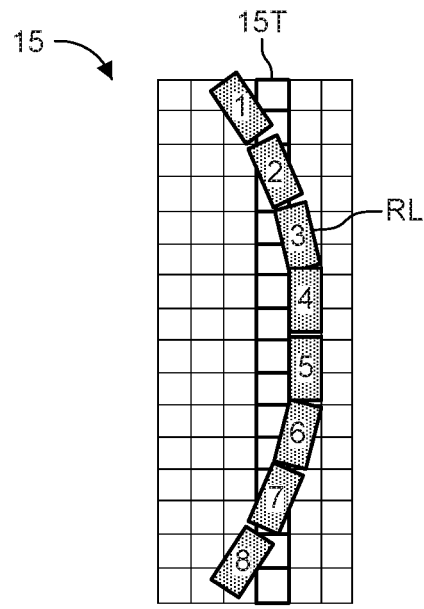
Figure 4B:
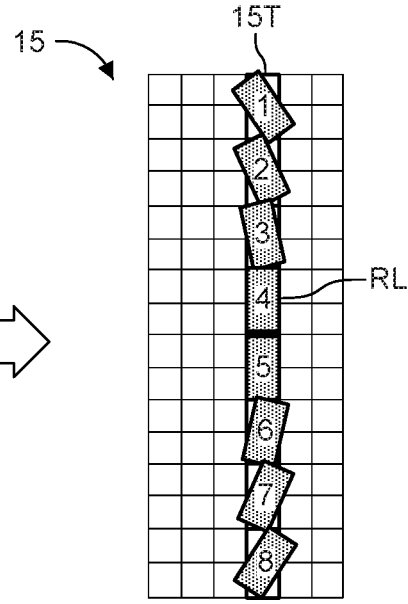

FIGS. 4A and 4B illustrate transmitter side compensation techniques used to align a TX FOV with an RX FOV according to one or more embodiments. In both figures, a left diagram illustrates a misalignment before auto-calibration and the right diagram illustrates a result after auto-calibration, where the auto-calibration is performed by shifting the TX FOV. In addition, both figures illustrate a projection of the receiving line RL projected onto a portion of the photodetector array 15. The receiving line includes eight segments, each corresponding to a different laser channel (i.e., a different light source). Thus, eight light sources are used in this example. The eight light sources are configured to transmit a respective light beam at a discrete transmission angle TX° resulting in the receiving line RL being incident on the photodetector array 15.

In addition, both figures identify a target pixel column 15T mapped to the discrete angle TX°. In this case, each laser beam (i.e., each laser source) is mapped vertically to two adjacent pixels of the target pixel column 15T. The target pixel column 15T defines the receiver angle RX° for the corresponding discrete transmission angle TX°.

In FIG. 4A, a misalignment angle β is present between the discrete transmission angle TX° and the receiver angle RX°. As a result, a misalignment offset d in the horizontal direction is present and only a portion of the receiving line RL intended for the target pixel column 15T is actually incident on the target pixel column 15T.

As demonstrated in the right side of FIG. 4A, a timing offset is applied to each light source such that a transmission time of a laser relative to the position of the MEMS mirror 12 is adjusted to coincide with the target pixel column 15T, and, specifically, with the target pixels corresponding to the light source. As noted above, each light source has its own mapping information stored in a corresponding look-up table. Since there is a horizontal misalignment, the timing offset is applied to the horizontal mapping information stored in the corresponding look-up table. The calibration is performed individually for each light source.

For each light source, the system controller 23 determines a location at which a corresponding light beam is incident on the photodetector array 15, determines the misalignment offset d for each light source relative to the target pixel column 15T, determines a timing offset for each a light source is adjusted according to the misalignment offset d, and updates the mapping information in the corresponding look-up table based on the determined timing offset. Since the misalignment offset d may be different for each light source, the timing offset for each light source may also be different.

Determining the location at which a corresponding light beam is incident on the photodetector array 15 may be performed by activating all pixels of the photodetector array 15, and detecting at which pixels the corresponding light beam is incident thereon.

Once the transmitter 21 has been calibrated, the transmission angle TX° and the receiver angle RX° are aligned and the receiving line RL is substantially projected onto the target pixel column 15T. Thus, a single pixel column can be enabled for a corresponding discrete transmission angle. That is, the timing offset can be configured such that, for each discrete transmission angle, the corresponding receiving line RL is incident on a single pixel column. In this way, the detector readout can be simplified. Furthermore, high accuracy of the calibration (i.e., high resolution of the offset compensation) can be achieved.

In FIG. 4B, the calibration technique applied is similar to the calibration technique applied to FIG. 4A. However, in the case of FIG. 4B, the cause of the misalignment is different. Here, there may be a misalignment as a result of a distortion caused by a component of the transmitter 21, such as a lens.

The distortion can be corrected in a similar manner described above in conjunction with FIG. 4A. In particular, for each light source, the system controller 23 determines a location at which a corresponding light beam is incident on the photodetector array 15, determines the misalignment offset d for each light source relative to the target pixel column 15T, determines a timing offset for each a light source is adjusted according to the misalignment offset d, and updates the mapping information in the corresponding look-up table based on the determined timing offset. Since the misalignment offset d may be different for each light source, the timing offset for each light source may also be different.

Figure 5A:
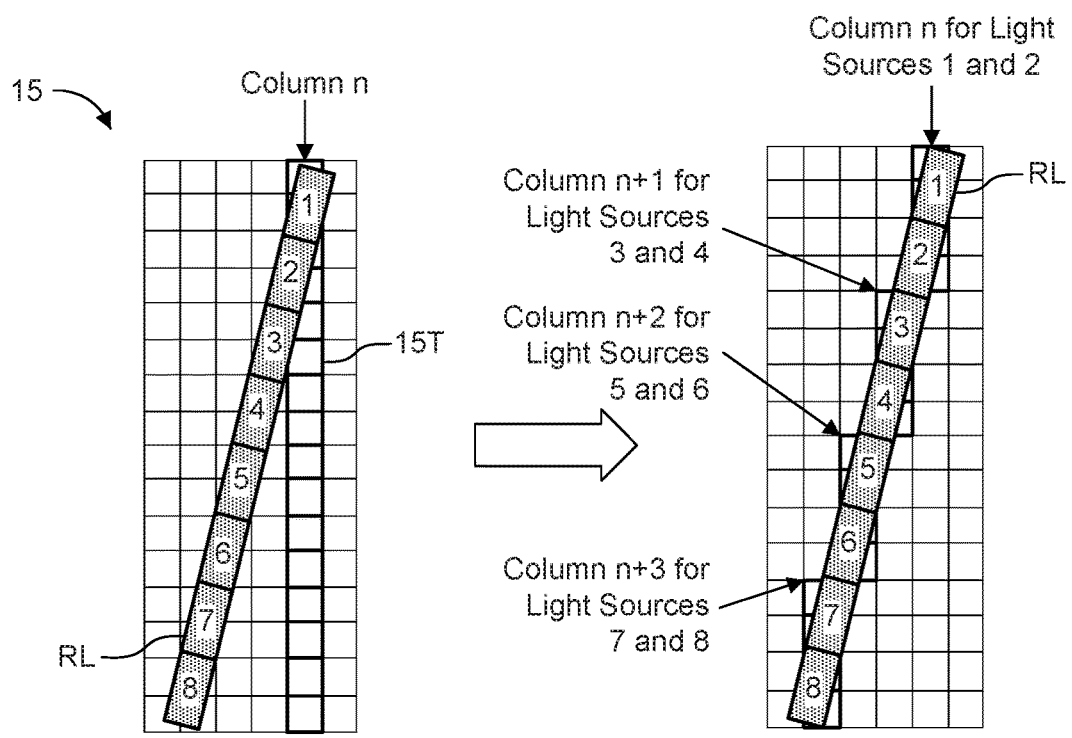
FIGS. 5A and 5B illustrate receiver side compensation techniques used to align a TX FOV with an RX FOV according to one or more embodiments.
Figure 5B:
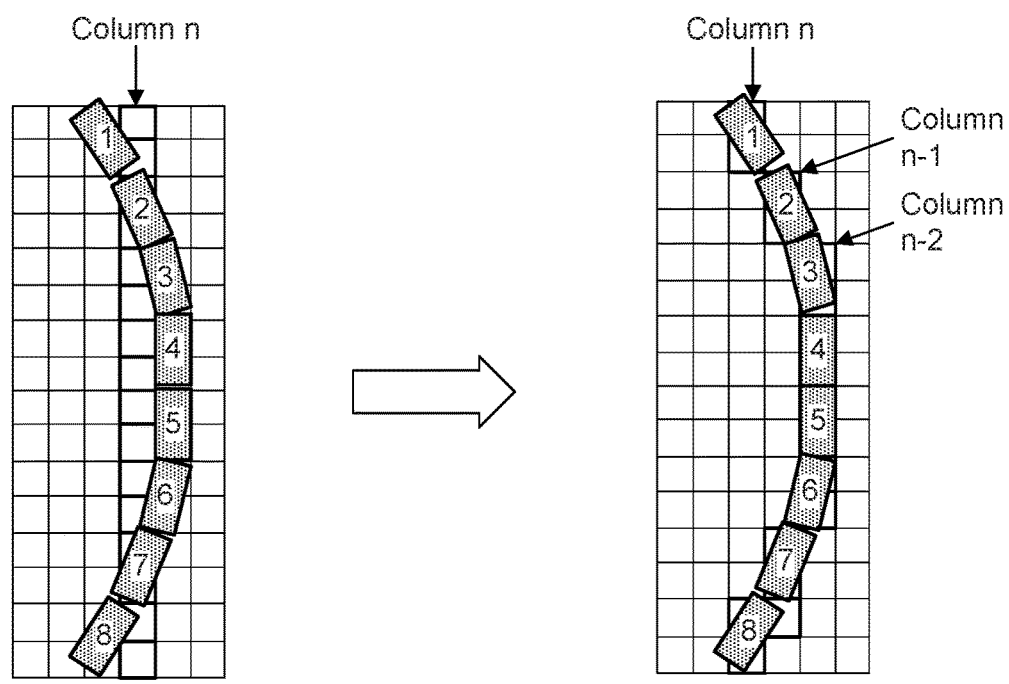

FIGS. 5A and 5B illustrate receiver side compensation techniques used to align a TX FOV with an RX FOV according to one or more embodiments. In both figures, a left diagram illustrates a misalignment before auto-calibration and the right diagram illustrates a result after auto-calibration, where the auto-calibration is performed by shifting the RX FOV. In addition, both figures illustrate a projection of the receiving line RL projected onto a portion of the photodetector array 15. The receiving line includes eight segments, each corresponding to a different laser channel (i.e., a different light source). Thus, eight light sources are used in this example. The eight light sources are configured to transmit a respective light beam at a discrete transmission angle TX° resulting in the receiving line RL being incident on the photodetector array 15.

In FIGS. 4A and 4B, the timing offset of each light source was adjusted to align with a target pixel column 15T. This resulted in a shift of the projection of the receiving line onto the target pixel column 15T. In contrast, in FIGS. 5A and 5B, the timing of the laser transmission remains unchanged for the receiver side compensation technique. Instead, the activation of target pixels at the receiver is changed to follow the expected position of the receiving line RL. In other words, the assignment of target pixels corresponding to a discrete transmission angle TX° is modified for each light source.

In particular, for each light source, the system controller 23 determines a location at which a corresponding light beam is incident on the photodetector array 15, identifies one or more pixels at the location, and updates the mapping information in a corresponding look-up table for the detector readout circuit based on the identified pixels.

Determining the location at which a corresponding light beam is incident on the photodetector array 15 may be performed by activating all pixels of the photodetector array 15, and detecting at which pixels the corresponding light beam is incident thereon. Thus, the misalignment is compensated at the receiver 22 by selecting the most responsive RX pixels for each TX laser channel.

The system includes Mk laser channels and Ni detector columns and Oj detector rows. For each laser channel k, the detector pixels ij with the highest intensity for each discrete transmission angle are defined.

For example, in the left diagram of FIG. 5A, column n was originally set as the target pixel column 15T for all light sources 1-8. Thus, before auto-calibration, all laser channels are read by the same column n for a given discrete transmission angle. After auto-calibration, each laser channel has an assigned pixel column and pixel row (i.e., assigned target pixels) that have the highest intensity for a given discrete transmission angle. The calibration is performed for each discrete angle and the mapping information in a corresponding look-up table for the detector readout circuit is updated accordingly. Thus, in the right diagram of FIG. 5A, pixel column n is assigned to light sources 1 and 2 for the given discrete transmission angle, pixel column n+1 is assigned to light sources 3 and 4 for the given discrete transmission angle, pixel column n+2 is assigned to light sources 5 and 6 for the given discrete transmission angle, and pixel column n+3 is assigned to light sources 7 and 8 for the given discrete transmission angle.

A similar receiver side compensation technique is used for compensating the left diagram of FIG. 5B. Prior to the auto-calibration with a distortion effect present, all laser channels are configured to be read by the same pixel column n. However, after the auto-calibration with the distortion effect present, each laser channel has an assigned pixel column and pixel row (i.e., assigned target pixels) that have the highest intensity for a given discrete transmission angle. The calibration is performed for each discrete angle and the mapping information in a corresponding look-up table for the detector readout circuit is updated accordingly. Thus, in the right diagram of FIG. 5B, pixel column n is assigned to light sources 1 and 8 for the given discrete transmission angle, pixel column n−1 is assigned to light sources 2 and 7 for the given discrete transmission angle, and pixel column n−2 is assigned to light sources 3-6 for the given discrete transmission angle.

Figure 6:
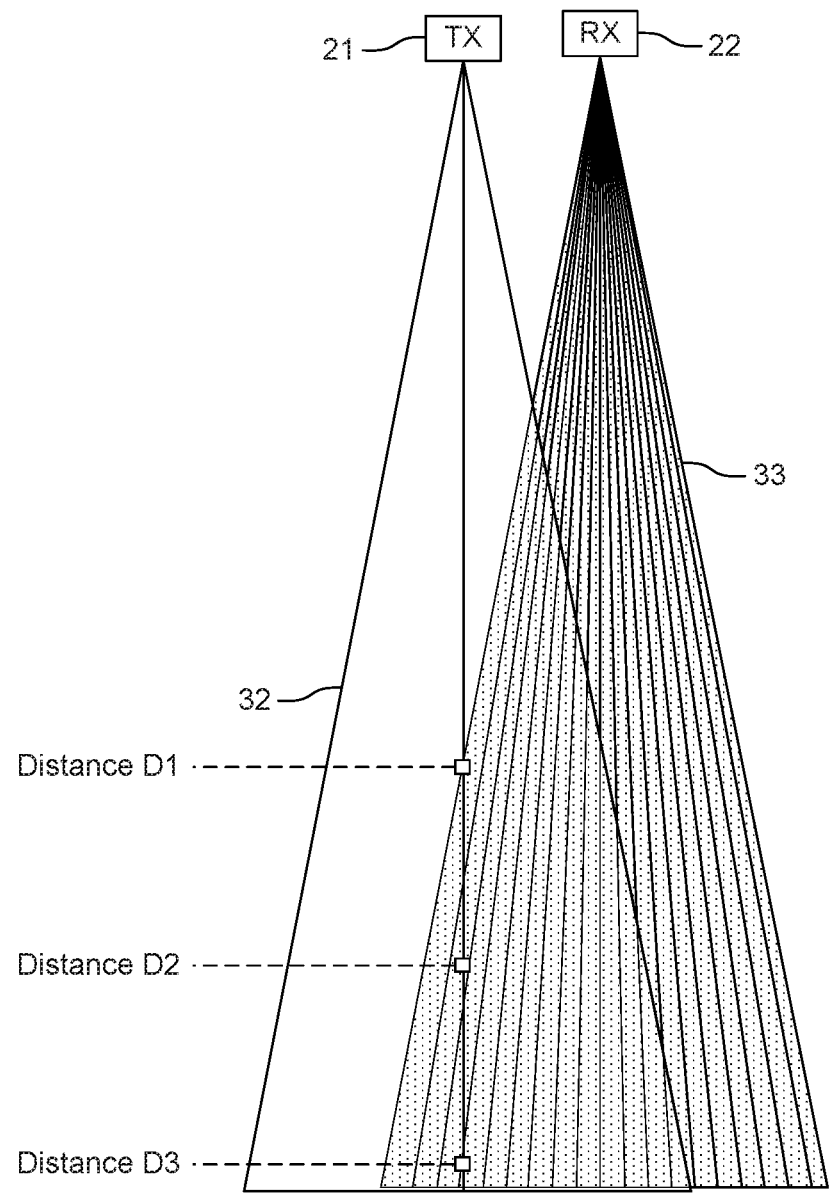
FIG. 6 illustrates receiver side compensation technique used to align a TX FOV with an RX FOV according to one or more embodiments.

FIG. 6 illustrates receiver side compensation technique used to align a TX FOV with an RX FOV according to one or more embodiments. In particular, the receiver side compensation technique shown in FIG. 6 is an extension of the compensation technique described in relation to FIGS. 5A and 5B, but also factors in different distances for pixel or column activation/deactivation.

In this case, the mapping of the photodetector array 15 can change for different distances. For example, up to a first transmission distance d1 (i.e., distance zero to d1), pixel column a is enabled; for distances greater than distance d1 up to distance d2, pixel column b is enabled; for distances greater than distance d2 up to distance d3, pixel column c is enabled; and for distances greater than distance d3, pixel column d is enabled. Thus, certain pixel columns can be enabled (activated) or disabled (deactivated) based on a time-of-flight. As a result, different overlapped areas of the TX FOV and the RX FOV are defined according to different distances. Each mapping for a respective pixel may thus be defined according to a light source, a discrete transmission angle, and a distance or a distance range.

Figure 7:
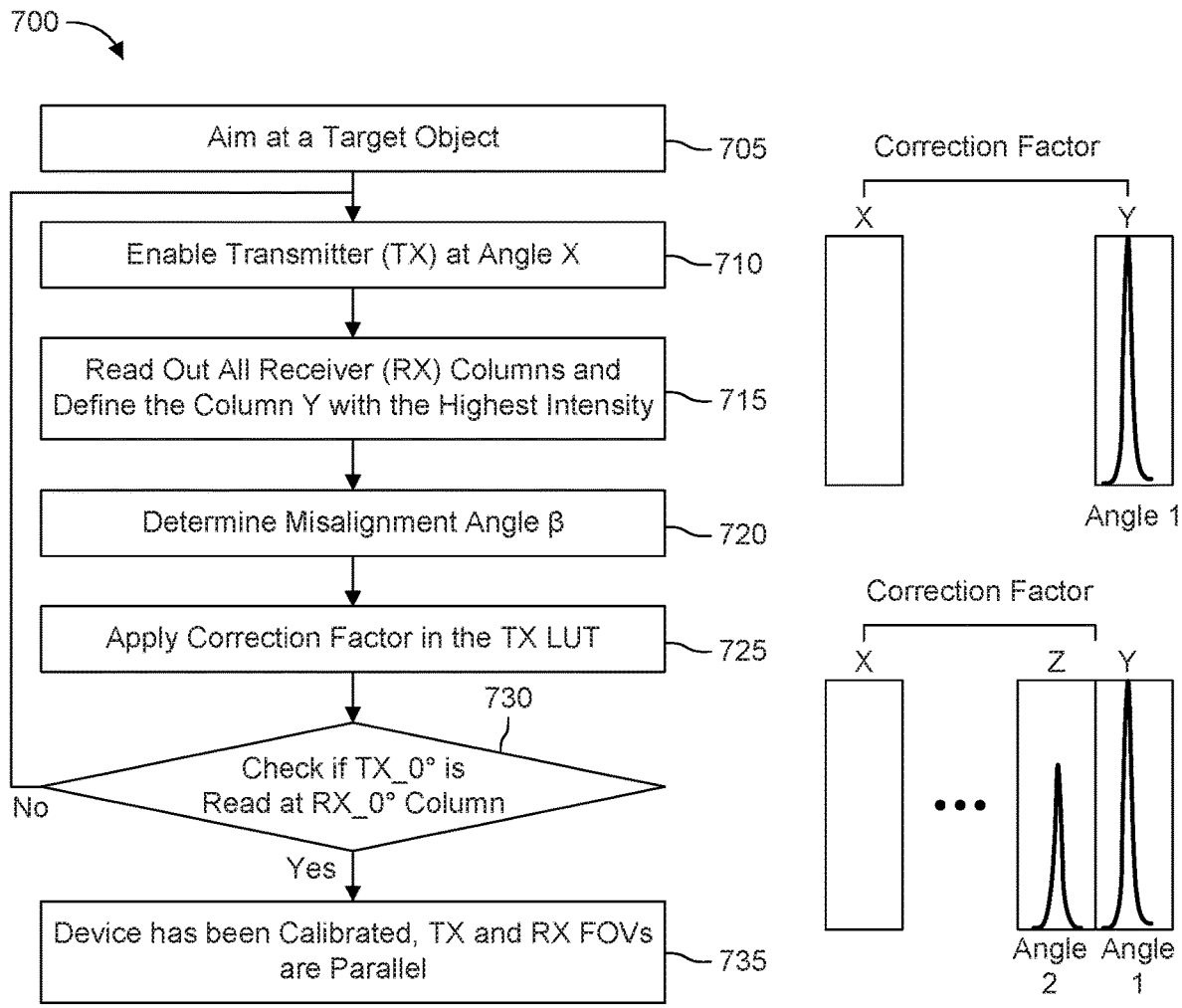
FIG. 7 illustrates a flow diagram of a transmitter side compensation technique used to align a TX FOV with an RX FOV according to one or more embodiments.

FIG. 7 illustrates a flow diagram of a transmitter side compensation technique 700 used to align a TX FOV with an RX FOV according to one or more embodiments.

The transmitter side compensation method 700 includes pointing the LIDAR system at a flat, uniform reference target, such as a white wall, that is larger than the LIDAR FOV (i.e., larger than the full FOV) (operation 705), and enabling the transmitter to transmit a laser beam at angle X (operation 710). The method 700 further includes reading out all receiver pixel columns and identifying a pixel column Y with the highest intensity in response to measured light (operation 715). In the event that two or more adjacent pixel columns are determined to have an intensity greater than a predetermined threshold, operation 715 further includes identifying a second pixel column Z with the second highest intensity in response to measured light.

The method 700 further includes determining a misalignment angle $\beta$, defined as $\beta = X - \text{angle1}(Y)$ (operation 720). Here, X is a certain angle in the FOV that the transmitter is illuminating (i.e., an angle at which a laser beam is transmitted), and angle1(Y) is a certain angle at which a pixel column Y is directed to (i.e., corresponds to) in the FOV (i.e., a receiving angle at which the pixel column Y is mapped to).

In the case that there are two pixel columns identified, the misalignment angle $\beta$ is defined as $\beta = X - (\text{angle2}(Z) + (\text{angle1}(Y) - \text{angle2}(Z)) * \text{Amplitude}(Z)/\text{Amplitude}(Y))$. Here, X is a certain angle that the transmitter is illuminating (i.e., at which a laser beam is transmitted), and angle1(Y) is a certain angle at which a pixel column Y is directed to (i.e., corresponds to) in the FOV (i.e., a receiving angle at which the pixel column Y is mapped to), angle2(Z) is a certain angle at which a pixel column Z is directed to (i.e., corresponds to) in the FOV (i.e., a receiving angle at which the pixel column Z is mapped to), Amplitude(Y) is the amplitude of the light signal detected by pixel column Y (i.e., the amplitude of the electrical signal generated by pixel column Y), and Amplitude(Z) is the amplitude of the light signal detected by pixel column Z (i.e., the amplitude of the electrical signal generated by pixel column Z).

The method 700 further includes applying a correction factor (e.g., a timing offset) in the TX look-up table for each light source (operation 725), and checking whether the discrete transmit angle X is read at the target pixel column (i.e., whether the discrete transmit angle coincides with the receiver angle) (operation 730). This check can be performed by again transmitting a laser beam at angle X, and monitoring the response at pixel column Y or pixel columns Y and Z. If the pixel column or columns do not match with the transmit angle X, the procedure returns to operation 710. On the other hand, if the pixel column or columns match the transmit angle X, the LIDAR system is found to be calibrated (operation 735).

It will also be appreciated that the compensation method 700 can be performed in real-time during operation of the LIDAR system, and the calibration is not limited to being performed in a calibration mode or in front of a white wall. In other words, additional signal processing may be used to perform calibration in operation mode in a real-world environment with non-uniform objects.

Figure 8:
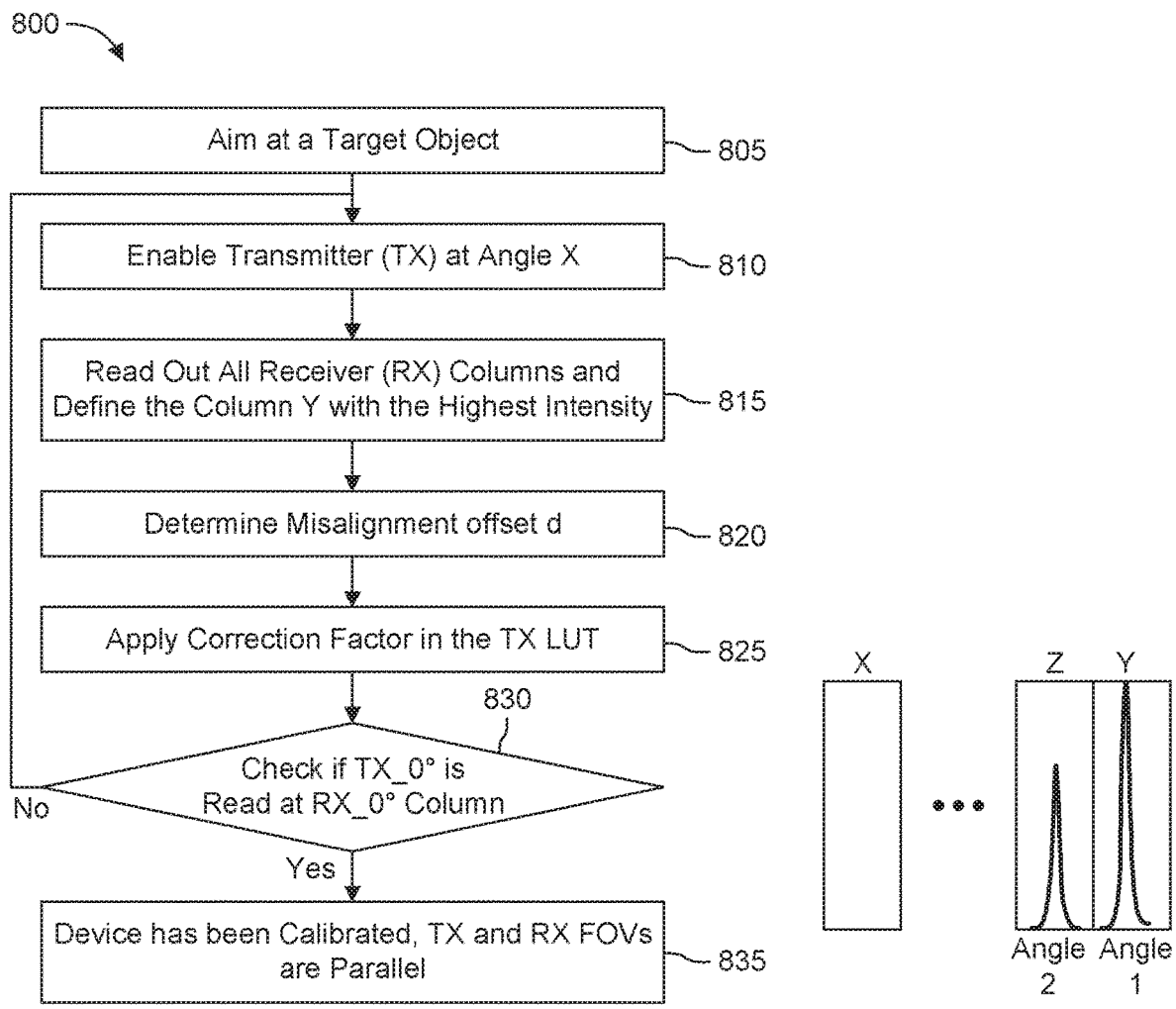
FIG. 8 illustrates a flow diagram of a transmitter side compensation technique used to align a TX FOV with an RX FOV according to one or more embodiments.

FIG. 8 illustrates a flow diagram of a transmitter side compensation technique 800 used to align a TX FOV with an RX FOV according to one or more embodiments. In particular, the transmitter side compensation method corresponds to the compensation technique described in conjunction with FIGS. 4A and 4B.

The transmitter side compensation method 800 includes pointing the LIDAR system at a flat, uniform reference target, such as a white wall, that is larger than the LIDAR FOV (i.e., larger than the full FOV) (operation 805), and enabling the transmitter to transmit a laser beam at angle X (operation 810). The method 800 further includes reading out all receiver pixel columns and identifying a pixel column Y with the highest intensity in response to measured light (operation 815). In the event that two or more adjacent pixel columns are determined to have an intensity greater than a predetermined threshold, operation 815 further includes identifying a second pixel column Z with the second highest intensity in response to measured light. The method 800 further includes determining a misalignment offset d, defined as d=X−angle1(Y) (operation 820). In the case that there are two pixel columns identified, the misalignment angle β is defined as d=X−(angle2(Z)+(angle1(Y)−angle2(Z))*Amplitude(Z)/Amplitude(Y)).

The method 800 further includes applying a correction factor (e.g., a timing offset) in the TX look-up table for each light source (operation 825), and checking whether the discrete transmit angle X is read at the target pixel column (i.e., whether the discrete transmit angle coincides with the receiver angle) (operation 830). This check can be performed by again transmitting a laser beam at angle X, and monitoring the response at pixel column Y or pixel columns Y and Z. If the pixel column or columns do not match with the transmit angle X, the procedure returns to operation 810. On the other hand, if the pixel column or columns match the transmit angle X, the LIDAR system is found to be calibrated (operation 835).

It will also be appreciated that the compensation method 800 can be performed in real-time during operation of the LIDAR system, and the calibration is not limited to being performed in a calibration mode or in front of a white wall. In other words, additional signal processing may be used to perform calibration in operation mode in a real-world environment with non-uniform objects.

Figure 9:
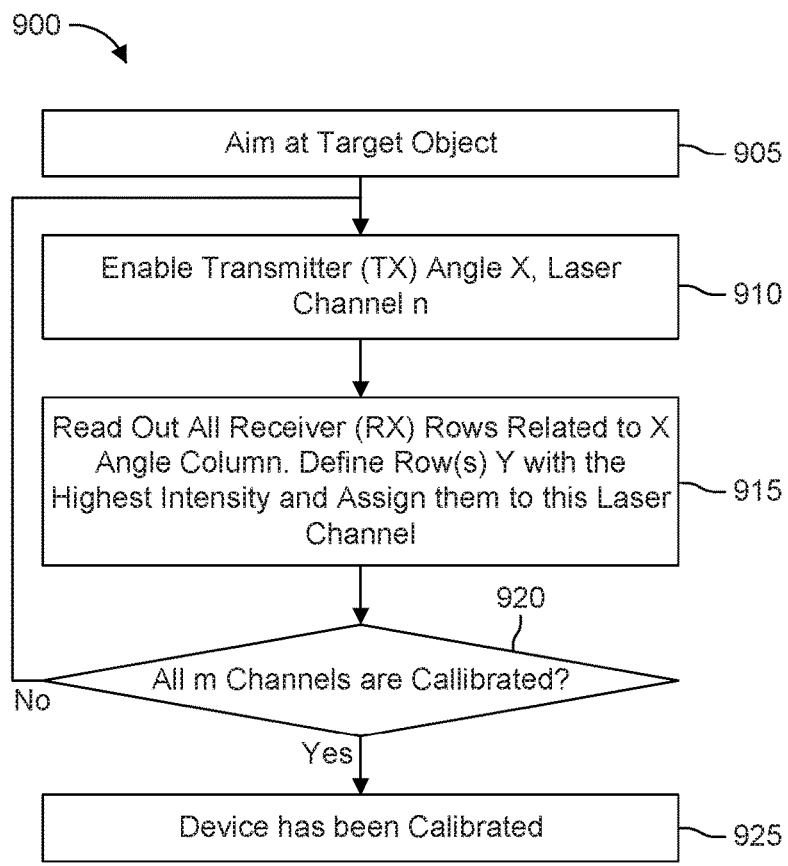
FIG. 9 illustrates a flow diagram of a receiver side compensation method used to align a TX FOV with an RX FOV according to one or more embodiments.
Figure 9:
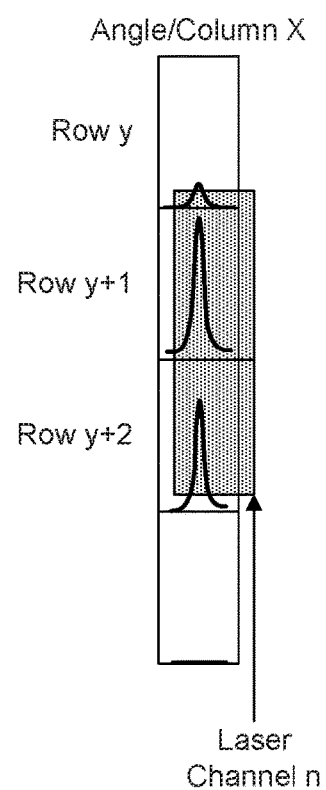

FIG. 9 illustrates a flow diagram of a receiver side compensation method 900 used to align a TX FOV with an RX FOV according to one or more embodiments. In particular, the receiver side compensation method corresponds to the compensation technique described in conjunction with FIGS. 5A and 5B.

The receiver side compensation method 900 includes pointing the LIDAR system at a flat, uniform reference target, such as a white wall, that is larger than the LIDAR FOV (i.e., larger than the full FOV) (operation 905), and enabling the transmitter to transmit a laser beam at angle X and enabling laser channel n (operation 910). The method 900 further includes reading out all receiver pixel rows related to a pixel column that corresponds to angle X, identifying pixels row(s) Y with the highest intensity in response to measured light, and assigning the identified pixel row(s) to the laser channel n (operation 915). Thus, laser channel n has been calibrated. The compensation method 900 further includes determining whether all laser channels have been calibrated (operation 920). If not, the process repeats for laser channel n+1, and so on until all laser channels have been calibrated (operation 925).

It will also be appreciated that the compensation method 900 can be performed in real-time during operation of the LIDAR system, and the calibration is not limited to being performed in a calibration mode or in front of a white wall. In other words, additional signal processing may be used to perform calibration in operation mode in a real-world environment with non-uniform objects.

Figure 10:
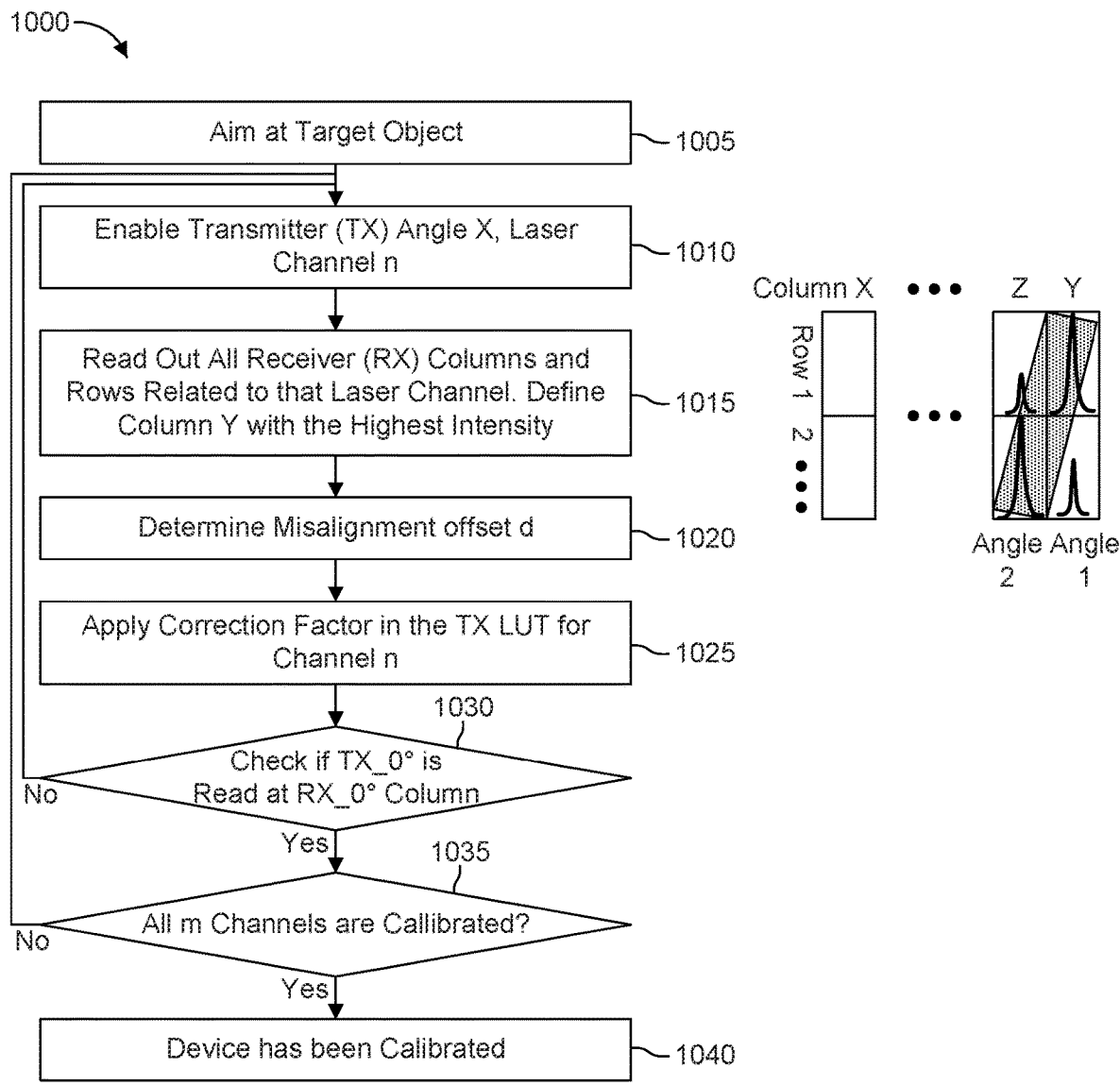
FIG. 10 illustrates a flow diagram of a transmitter side compensation technique used to align a TX FOV with an RX FOV according to one or more embodiments.

FIG. 10 illustrates a flow diagram of a transmitter side compensation technique 1000 used to align a TX FOV with an RX FOV according to one or more embodiments.

The transmitter side compensation method 1000 includes pointing the LIDAR system at a flat, uniform reference target, such as a white wall, that is larger than the LIDAR FOV (i.e., larger than the full FOV) (operation 1005), and enabling the transmitter to transmit a laser beam at angle X and enabling laser channel n (operation 1010). The method 1000 further includes reading out all receiver pixel rows and pixel columns related to the laser channel n, and identifying a pixel column Y with the highest intensity in response to measured light (operation 1015). In the event that two or more adjacent pixel columns are determined to have an intensity greater than a predetermined threshold, operation 1015 further includes identifying a second pixel column Z with the second highest intensity in response to measured light.

The method 1000 further includes determining a misalignment offset d, defined as d=X−angle1(Y) (operation 1020). In the case that there are two pixel columns identified, the misalignment angle β is defined as d=X−(angle2(Z)+(angle 1(Y)−angle2(Z))*Amplitude(Z)/Amplitude(Y)).

The method 1000 further includes applying a correction factor (e.g., a timing offset) in the TX look-up table for laser channel n (operation 1025), and checking whether the discrete transmit angle X is read at the target pixel column (i.e., whether the discrete transmit angle coincides with the receiver angle) (operation 1030). This check can be performed by again transmitting a laser beam at angle X, and monitoring the response at pixel column Y or pixel columns Y and Z. If the pixel column or columns do not match with the transmit angle X, the procedure returns to operation 1010. On the other hand, if the pixel column or columns match the transmit angle X, the laser channel n is found to be calibrated. The compensation method 1000 further includes determining whether all laser channels have been calibrated (operation 1035). If not, the process repeats for laser channel n+1, and so on until all laser channels have been calibrated (operation 1040).

It will also be appreciated that the compensation method 800 can be performed in real-time during operation of the LIDAR system, and the calibration is not limited to being performed in a calibration mode or in front of a white wall. In other words, additional signal processing may be used to perform calibration in operation mode in a real-world environment with non-uniform objects.

Although embodiments described herein relate to a MEMS device with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry", as used herein, refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) system, comprising:
   a LIDAR transmitter configured with a first field of view and configured to transmit laser beams into the first field of view at a plurality of discrete transmission angles in order to scan the first field of view with the laser beams;
   a LIDAR receiver configured with a second field of view and configured to receive reflected laser beams from the second field of view and generate electrical signals based on the received reflected laser beams;
   a controller configured to shift at least one of the first field of view or the second field of view based on a misalignment in order to optimize an overlap of the first field of view and the second field of view; and
   a memory configured to store mapping information,
   wherein the controller is configured to detect the misalignment between the first field of view and the second field of view, and shift at least one of the first field of view or the second field of view based on the detected misalignment in order to optimize the overlap of the first field of view and the second field of view,
   wherein the LIDAR transmitter comprises:
      a light source configured to generate the laser beams at a plurality of transmission times; and
      a scanning mirror configured to oscillate about a scanning axis such that the laser beams are received from the light source and projected into the first field of view, wherein the laser beams move across the first field of view as the scanning mirror oscillates about the scanning axis,
   wherein the LIDAR receiver comprises:
      a two-dimensional (2D) photodetector array comprising a plurality of pixels arranged in a plurality of pixel rows and a plurality of pixel columns, wherein each pixel is configured to generate an electrical signal based on received light,
   wherein the mapping information maps the plurality of transmission times to different target pixels of the plurality of pixels, wherein each transmission time is mapped to at least one target pixel and corresponds to a different discrete transmission angle of the plurality of discrete transmission angles,
   wherein the controller is configured to:
      select a discrete transmission angle,
      trigger the light source at a transmission time to generate a laser beam having a transmission direction that corresponds to the selected discrete transmission angle,
      enable the plurality of pixels of the 2D photodetector array during a measurement window corresponding to the transmission time,
      evaluate an intensity of each of the plurality of pixels based on the electrical signals generated by the plurality of pixels,
      select at least one first pixel having a highest intensity among the plurality of pixels as the at least one target pixel, and
      update the mapping information to link the at least one target pixel to the selected discrete transmission angle.

2. The LIDAR system of claim 1, wherein the first field of view is larger than the second field of view, and the controller is configured to shift at least one of the first field of view or the second field of view such that the second field of view is completely overlapped by the first field of view, in at least one of a horizontal direction or a vertical direction.

3. The LIDAR system of claim 1, wherein the first field of view is larger than the second field of view, and the controller is configured to shift at least one of the first field of view or the second field of view such that the second field of view is completely overlapped by the first field of view in both a horizontal direction and a vertical direction.

4. The LIDAR system of claim 1, wherein the controller is configured to detect the misalignment between the first field of view and the second field of view, and shift at least one of the first field of view or the second field of view based on the detected misalignment in order to optimize the overlap of the first field of view and the second field of view.

5. The LIDAR system of claim 4, wherein the controller is configured to:
   compare an expected location at which a reflected laser beam is expected to be incident at the LIDAR receiver with an actual location at which the reflected laser beam is incident at the LIDAR receiver, wherein the expected location is mapped to a discrete transmission angle at which a laser beam, associated with the reflected laser beam, is transmitted,
   calculate a correction factor based on a difference between the expected location and the actual location, and
   shift the at least one of the first field of view or the second field of view based on the correction factor.

6. The LIDAR system of claim 4, wherein the controller is configured to:
   detect a region of the LIDAR receiver at which a reflected laser beam is incident thereon,
   link the detected region to a discrete transmission angle at which a laser beam, associated with the reflected laser beam, is transmitted such that, upon transmitting a subsequent laser beam at the discrete transmission angle, the detected region is activated.

7. The LIDAR system of claim 6, wherein the controller is configured to detect a misalignment angle between the first field of view and the second field of view, calculate a correction factor based on the detected misalignment angle, and shift the at least one of the first field of view or the second field of view based on the correction factor.

8. The LIDAR system of claim 6, wherein the controller is configured to detect a misalignment offset between the first field of view and the second field of view, calculate a correction factor based on the detected misalignment offset, and shift the at least one of the first field of view or the second field of view based on the correction factor.

9. The LIDAR system of claim 1, wherein the controller is configured to:
  select at least one second pixel having a second highest intensity among the plurality of pixels as the at least one target pixel, and
  update the mapping information to link the at least one target pixel to the selected discrete transmission angle.

10. A Light Detection and Ranging (LIDAR) system, comprising:
  a LIDAR transmitter configured with a first field of view and configured to transmit laser beams into the first field of view at a plurality of discrete transmission angles in order to scan the first field of view with the laser beams;
  a LIDAR receiver configured with a second field of view and configured to receive reflected laser beams from the second field of view and generate electrical signals based on the received reflected laser beams;
  a controller configured to shift at least one of the first field of view or the second field of view based on a misalignment in order to optimize an overlap of the first field of view and the second field of view; and
  a memory configured to store mapping information,
  wherein the controller is configured to detect the misalignment between the first field of view and the second field of view, and shift at least one of the first field of view or the second field of view based on the detected misalignment in order to optimize the overlap of the first field of view and the second field of view,
  wherein the LIDAR transmitter comprises:
    a light source configured to generate the laser beams at a plurality of transmission times; and
    a scanning mirror configured to oscillate about a scanning axis such that the laser beams are received from the light source and projected into the first field of view, wherein the laser beams move across the first field of view as the scanning mirror oscillates about the scanning axis,
  wherein the LIDAR receiver comprises:
    a two-dimensional (2D) photodetector array comprising a plurality of pixels arranged in a plurality of pixel rows and a plurality of pixel columns, wherein each pixel is configured to generate an electrical signal based on received light,
  wherein the mapping information maps the plurality of transmission times to different target pixels of the plurality of pixels, wherein each transmission time is mapped to at least one target pixel and corresponds to a different discrete transmission angle of the plurality of discrete transmission angles,
  wherein the controller is configured to:
    compare first position information of at least one target pixel at which a reflected laser beam is expected to be incident with second position information of at least one receiving pixel of the plurality of pixels at which the reflected laser beam is incident,
    calculate a correction factor based on a difference between the first position information and the second position information, and
    update the mapping information based on the correction factor,
  wherein the correction factor is a time offset applied to at least one of the plurality of transmission times to generate at least one updated transmission time, and the controller is configured to update the mapping information with the at least one updated transmission time.

11. The LIDAR system of claim 10, wherein, for each transmission time, the controller is configured to enable the at least one target pixel in synchronization therewith based on the mapping information.

12. A Light Detection and Ranging (LIDAR) system, comprising:
  a LIDAR transmitter configured with a first field of view and configured to transmit laser beams into the first field of view at a plurality of discrete transmission angles in order to scan the first field of view with the laser beams;
  a LIDAR receiver configured with a second field of view and configured to receive reflected laser beams from the second field of view and generate electrical signals based on the received reflected laser beams;
  a controller configured to shift at least one of the first field of view or the second field of view based on a misalignment in order to optimize an overlap of the first field of view and the second field of view; and
  a memory configured to store mapping information,
  wherein the controller is configured to detect the misalignment between the first field of view and the second field of view, and shift at least one of the first field of view or the second field of view based on the detected misalignment in order to optimize the overlap of the first field of view and the second field of view,
  wherein the LIDAR transmitter comprises:
    a light source configured to generate the laser beams at a plurality of transmission times; and
    a scanning mirror configured to oscillate about a scanning axis such that the laser beams are received from the light source and projected into the first field of view, wherein the laser beams move across the first field of view as the scanning mirror oscillates about the scanning axis,
  wherein the LIDAR receiver comprises:
    a two-dimensional (2D) photodetector array comprising a plurality of pixels arranged in a plurality of pixel rows and a plurality of pixel columns, wherein each pixel is configured to generate an electrical signal based on received light,
  wherein the mapping information maps the plurality of transmission times to different target pixels of the plurality of pixels, wherein each transmission time is mapped to at least one target pixel and corresponds to a different discrete transmission angle of the plurality of discrete transmission angles,
  wherein the controller is configured to:
  select a discrete transmission angle,
  select a first detection range and a second detection range for the selected discrete transmission angle,
  trigger the light source at a transmission time to generate a laser beam having a transmission direction that corresponds to the selected discrete transmission angle,
  enable the plurality of pixels of the 2D photodetector array during a measurement window corresponding to the transmission time,
  evaluate an intensity of each of the plurality of pixels based on the electrical signals generated by the plurality of pixels,
  select at least one first pixel having a highest first intensity among the plurality of pixels as at least one first target pixel for the first detection range, update the mapping information to link the at least one first target pixel to the selected discrete transmission angle for the first detection range, select at least one second pixel having a highest second intensity among the plurality of pixels as at least one second target pixel for the second detection range, and update the mapping information to link the at least one second target pixel to the selected discrete transmission angle for the second detection range.

13. A Light Detection and Ranging (LIDAR) system, comprising:

a LIDAR transmitter configured with a first field of view and configured to transmit laser beams into the first field of view at a plurality of discrete transmission angles in order to scan the first field of view with the laser beams;

a LIDAR receiver configured with a second field of view and configured to receive reflected laser beams from the second field of view and generate electrical signals based on the received reflected laser beams;

a controller configured to shift at least one of the first field of view or the second field of view based on a misalignment in order to optimize an overlap of the first field of view and the second field of view; and a memory configured to store mapping information, wherein the controller is configured to detect the misalignment between the first field of view and the second field of view, and shift at least one of the first field of view or the second field of view based on the detected misalignment in order to optimize the overlap of the first field of view and the second field of view, wherein the LIDAR transmitter comprises:

a light source configured to generate the laser beams at a plurality of transmission times; and a scanning mirror configured to oscillate about a scanning axis such that the laser beams are received from the light source and projected into the first field of view, wherein the laser beams move across the first field of view as the scanning mirror oscillates about the scanning axis, wherein the LIDAR receiver comprises:

a two-dimensional (2D) photodetector array comprising a plurality of pixels arranged in a plurality of pixel rows and a plurality of pixel columns, wherein each pixel is configured to generate an electrical signal based on received light, wherein the mapping information maps the plurality of transmission times to different target pixels of the plurality of pixels, wherein each transmission time is mapped to at least one target pixel and corresponds to a different discrete transmission angle of the plurality of discrete transmission angles, wherein the controller is configured to:

compare first position information of at least one target pixel at which a reflected laser beam is expected to be incident with second position information of at least one receiving pixel of the plurality of pixels at which the reflected laser beam is incident, calculate a correction factor based on a difference between the first position information and the second position information, and update the mapping information based on the correction factor, wherein the controller is further configured to:

select a discrete transmission angle, trigger the light source at a transmission time to generate a laser beam having a transmission direction that corresponds to the selected discrete transmission angle, enable the plurality of pixels of the 2D photodetector array during a measurement window corresponding to the transmission time, evaluate an intensity of each of the plurality of pixels based on the electrical signals generated by the plurality of pixels, identify at least one pixel having a highest intensity among the plurality of pixels as the at least one receiving pixel, calculate the correction factor based on the difference between the first position information and the second position information, and update the mapping information based on the correction factor.

14. The LIDAR system of claim 13, wherein the correction factor is a time offset applied to the transmission time to generate an updated transmission time, and the controller is configured to update the mapping information with the updated transmission time.

15. A Light Detection and Ranging (LIDAR) system, comprising:

a LIDAR transmitter configured with a first field of view and configured to transmit laser beams into the first field of view at a plurality of discrete transmission angles in order to scan the first field of view with the laser beams;

a LIDAR receiver configured with a second field of view and configured to receive reflected laser beams from the second field of view and generate electrical signals based on the received reflected laser beams;

a controller configured to shift at least one of the first field of view or the second field of view based on a misalignment in order to optimize an overlap of the first field of view and the second field of view; and a memory configured to store mapping information, wherein the controller is configured to detect the misalignment between the first field of view and the second field of view, and shift at least one of the first field of view or the second field of view based on the detected misalignment in order to optimize the overlap of the first field of view and the second field of view, wherein the LIDAR transmitter comprises:

a light source configured to generate the laser beams at a plurality of transmission times; and a scanning mirror configured to oscillate about a scanning axis such that the laser beams are received from the light source and projected into the first field of view, wherein the laser beams move across the first field of view as the scanning mirror oscillates about the scanning axis, wherein the LIDAR receiver comprises:

a two-dimensional (2D) photodetector array comprising a plurality of pixels arranged in a plurality of pixel rows and a plurality of pixel columns, wherein each pixel is configured to generate an electrical signal based on received light, wherein the mapping information maps the plurality of transmission times to different target pixels of the plurality of pixels, wherein each transmission time is mapped to at least one target pixel and corresponds to a different discrete transmission angle of the plurality of discrete transmission angles, wherein the controller is configured to:
compare first position information of at least one target pixel at which a reflected laser beam is expected to be incident with second position information of at least one receiving pixel of the plurality of pixels at which the reflected laser beam is incident,
calculate a correction factor based on a difference between the first position information and the second position information, and
update the mapping information based on the correction factor,
wherein the controller is further configured to:
select a discrete transmission angle,
select a first detection range and a second detection range for the selected discrete transmission,
trigger the light source at a transmission time to generate a laser beam having a transmission direction that corresponds to the selected discrete transmission angle,
enable the plurality of pixels of the 2D photodetector array during a measurement window corresponding to the transmission time,
evaluate a first intensity of each of the plurality of pixels for the first detection range and a second intensity of each of the plurality of pixels for the second detection range based on the electrical signals generated by the plurality of pixels,
identify, as the at least one receiving pixel, at least one first pixel having a highest first intensity among the plurality of pixels for the first detection range and at least one second pixel having a highest second intensity among the plurality of pixels for the second detection range,
calculate the correction factor based on the difference between the first position information and the second position information, and
update the mapping information based on the correction factor.

16. A method of calibrating a Light Detection and Ranging (LIDAR) system, the method comprising:
configuring a LIDAR transmitter with a first field of view;
configuring a LIDAR receiver with a second field of view;
transmitting laser beams into the first field of view at a plurality of discrete transmission angles in order to scan the first field of view with the laser beams;
receiving reflected laser beams from the second field of view;
generating electrical signals based on the received reflected laser beams; and
shifting at least one of the first field of view or the second field of view based on a misalignment in order to optimize an overlap of the first field of view and the second field of view;
selecting a discrete transmission angle;
triggering a light source at a transmission time to generate a laser beam having a transmission direction that corresponds to the selected discrete transmission angle;
enabling a plurality of pixels of a 2D photodetector array during a measurement window corresponding to the transmission time;
evaluating an intensity of each of the plurality of pixels based on the electrical signals generated by the plurality of pixels;
selecting at least one first pixel having a highest intensity among the plurality of pixels as at least one target pixel; and
updating mapping information to link the at least one target pixel to the selected discrete transmission angle, wherein the mapping information maps different discrete transmission angles to different target pixels of the plurality of pixels.

17. The method of claim 16, further comprising:
detecting the misalignment between the first field of view and the second field of view based on the electrical signals; and
shifting the at least one of the first field of view or the second field of view based on the detected misalignment in order to optimize the overlap of the first field of view and the second field of view.

18. The method of claim 17, further comprising:
comparing an expected location at which a reflected laser beam is expected to be incident at the LIDAR receiver with an actual location at which the reflected laser beam is incident at the LIDAR receiver, wherein the expected location is mapped to a discrete transmission angle at which a laser beam, associated with the reflected laser beam, is transmitted;
calculating a correction factor based on a difference between the expected location and the actual location; and
shifting the at least one of the first field of view or the second field of view based on the correction factor.

19. The method of claim 17, further comprising:
detecting a region of the LIDAR receiver at which a reflected laser beam is incident thereon; and
linking the detected region to a discrete transmission angle at which a laser beam, associated with the reflected laser beam, is transmitted such that, upon transmitting a subsequent laser beam at the discrete transmission angle, the detected region is activated.

20. The method of claim 17, wherein detecting the misalignment comprises detecting a misalignment angle between the first field of view and the second field of view, the method further comprising:
calculating a correction factor based on the detected misalignment angle; and
shifting the at least one of the first field of view or the second field of view based on the correction factor.

21. The method of claim 17, wherein detecting the misalignment comprises detecting a misalignment offset between the first field of view and the second field of view, the method further comprising:
calculating a correction factor based on the detected misalignment offset; and
shifting the at least one of the first field of view or the second field of view based on the correction factor.

* * * * *